United States Patent [19]

Service et al.

[11] 4,020,014

[45] Apr. 26, 1977

[54] SEMI-CONDUCTIVE SILICONE ELASTOMERS

[75] Inventors: Alfred Lewis Service, Watervliet; George Christie, Jr., Albany, both of N.Y.

[73] Assignee: General Electric Company, Waterford, N.Y.

[22] Filed: Jan. 21, 1976

[21] Appl. No.: 650,969

[52] U.S. Cl. .................. 252/511; 260/37 SB; 260/46.5 G; 260/46.5 UA; 260/825; 252/514

[51] Int. Cl.$^2$ .............................. H01B 1/06

[58] Field of Search .............. 252/511, 514; 260/46.5 UA, 37 SB

[56] References Cited

UNITED STATES PATENTS

| | | | |
|---|---|---|---|
| 3,425,967 | 2/1969 | Modic | 260/2.5 |
| 3,821,140 | 6/1974 | Milbert | 260/46.5 UA X |
| 3,882,083 | 5/1975 | Berger et al. | 260/46.5 UA |
| 3,892,707 | 7/1975 | Itoh et al. | 260/46.5 UA X |
| 3,900,617 | 8/1975 | Grenoble | 260/46.5 UA X |
| 3,914,369 | 10/1975 | Modic et al. | 264/225 |

*Primary Examiner*—Benjamin R. Padgett
*Assistant Examiner*—E. Suzanne Parr
*Attorney, Agent, or Firm*—John L. Young; E. Philip Koltos; Edward A. Hedman

[57] ABSTRACT

Conductive silicone elastomer compositions which cure under hot air vulcanization conditions are provided by formulating a vinylorganopolysiloxane gum, an organohydrogenpolysiloxane fluid, a conductive carbon black filler, a peroxide catalyst which is not normally capable of causing the composition to vulcanize in hot air and a small, effective amount of a catalyst comprising platinum or a platinum compound, in an amount which is less than that which will cause cross-linking in up to 24 hours at about 23° C. but at least an amount sufficient to cause the composition to cure under hot air vulcanization conditions.

21 Claims, No Drawings

SEMI-CONDUCTIVE SILICONE ELASTOMERS

This invention relates to improvements in silicone elastomer compositions. More particularly, it is concerned with providing electrically conductive silicone elastomers by formulating vinyl containing organopolysiloxanes, a liquid silicone having silicon-hydrogen bonds, conductive carbon black fillers, an organic peroxide catalyst, and a small amount, sufficient to catalyze vulcanization under hot air conditions, of a catalyst comprising platinum or a platinum compound.

BACKGROUND OF THE INVENTION

Silicone rubber can be made electrically conductive by using conductive carbon black as the filler. Acetylene blacks are found to be very useful for this purpose. Conductive silicone rubber gives the typical benefits of heat resistance, weather resistance, low temperature flexibility, and the like, of ordinary silicone rubber. Such rubber is finding increasing usefulness as an elastic heating medium (heat results from current flow), as well as in any electrical application where low electrical resistance is required. In general, a broad range of conductivities may be obtained in silicone rubber in incorporating varying amounts of the conductive carbon black into the formulation. The higher the carbon black content of the compound, the greater will be the conductivity, or lower will be the volume resistivity. In the present state of the art, the most desirable conductive compositions will exhibit a volume resistivity of not more than about 10,000 ohm-cm., a Shore A hardness of at least 50, a tensile strength of greater than 450 pounds per square inch and elongation of greater than 100 percent at break.

The specific requirements needed by conductive silicone rubber make it difficult to extend conventional silicone elastomer technology to this field of use. For example, the material must contain a type of carbon black that will conduct electricity, but all conductive blacks so far investigated can be cured only with peroxides, using compression molding or steam vulcanization, both of which require expensive equipment and high energy requirements. The catalyst which is normally used to vulcanize silicone elastomers with hot air, which is a cheaper, less energy and equipment intensive means of curing, is 2,4-dichlorobenzoyl peroxide. Unfortunately, however, silicone rubber compositions containing conductive blacks react with and deplete the 2,4-dichlorobenzoyl peroxide catalyst, and hot air vulcanization does not occur.

Many approaches to overcoming these problems and providing a hot air vulcanizing composition containing conductive blacks have been tried, but without success. These approaches have included substituting cross-linking agents, various other conductive blacks and catalyst compositions, and the substitution of platinum addition catalysts for the peroxide.

It has now been surprisingly discovered that if a peroxide catalyst different from the preferred prior art hot air vulcanization catalyst is substituted, there is obtained a composition which cures with compression molding or steam, but not with hot air. Moreover, if this composition is then treated with a small amount of platinum addition catalyst, not sufficient to cause cross-linking within about 24 hours at room temperature, 23° C., there will be obtained a useful conductive compound which will permit the materials to be mixed with a reasonable shelf age and still provide an extrudable product which, surprisingly, hot air cures. If too much of the platinum addition catalyst is used, such as a conventional amount, the rubber composition will tend to cross-link and become unusable in a short period of time, e.g., of the order of 2–4 hours. Using the platinum catalyst alone at a lower concentration extends the shelf age, but only provides a semi-cured rubber after hot air vulcanization. The foregoing indicates the need for use a combination of peroxide and platinum catalyst in a relatively narrow use range.

DESCRIPTION OF THE INVENTION

According to the present invention, there are provided in compositions vulcanizable to an electrically conductive silicone elastomer, said composition comprising:
 i. a vinylorganopolysiloxane gum;
 ii. an organohydrogenpolysiloxane;
 iii. an electrically conductive carbon black filler in an amount capable of rendering the cured composition electrically conductive; and
 iv. a small, effective amount, sufficient to cure the composition with steam or under compression molding conditions, of a peroxide catalyst which is not normally capable of curing the composition on exposure to hot air, the improvement which comprises including in said composition (v) a catalyst comprising platinum or a platinum compound in a small amount, at least effective to render the composition vulcanizable upon exposure to hot air but less than an amount which will cause any substantial cross linking of the composition within 24 hours at a temperature of about 23° C.

Within the invention as broadly described above, a preferred family of compositions will be those in which the organohydrogenpolysiloxane (ii) comprises from about 0.1 to about 1.0 parts by weight, the filler (iii) comprises from about 20 to about 50 parts by weight, the peroxide catalyst (iv) comprises from about 0.2 to about 2.0 parts by weight, and the catalyst (v) comprising platinum or a platinum compound comprises from about 0.0001 to about 0.005 parts by weight per 100 parts by weight of the gum (i).

The present invention also in its broadest aspects contemplates in a process for preparing an electrically conductive vulcanized silicone elastomer comprising:
 A. forming a composition of:
 i. a vinylorganopolysiloxane gum;
 ii. an organohydrogenpolysiloxane fluid;
 iii. an electrically conductive carbon black filler in an amount capable of rendering the cured composition electrically conductive; and
 iv. a small, effective amount, sufficient to cure the composition with steam or under compression molding conditions, of a peroxide catalyst which is not normally capable of curing the composition on exposure to hot air, and
 B. heating the composition under vulcanizing conditions until it is substantially cured, the improvement which comprises adding to said composition before vulcanization a catalyst comprising platinum or a platinum compound in a small amount, at least sufficient to render the composition vulcanizable upon exposure to hot air but less than an amount which will cause any substantial cross-linking of the composition within 24 hours at a temperature of about 23° C., shaping to form, and thereafter heating the composition in hot air until it has been substantially completely vulcanized.

All of the elements in the above-mentioned formulations and processes are well known to those of ordinary skill in the art of silicone elastomer formulation.

The vinylorganopolysiloxane gum is a conventional ingredient which is available from a number of commercial sources or can readily be made by following the teachings of the prior art. By way of illustration, the gum can be one of a formula

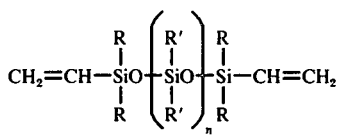

(I)

wherein R and R' may be the same or different and are monovalent hydrocarbon groups free of aliphatic unsaturation, with at least 50 mole percent of R' being methyl and where $n$ has a value sufficient to provide a gum-like consistency at room temperature. These vinyl-stopped diorganopolysiloxanes are also well known, as evidenced by U.S. Pat. No. 3,425,967, the disclosure of which is incorporated herein by reference.

The monovalent hydrogen groups represented by R and R' include alkyl, such as methyl, ethyl, propyl, isopropyl, butyl, octyl, dodecyl, and the like; cycloalkyl such as cyclopentyl, cyclohexyl, cycloheptyl, and the like; aryl, such as phenyl, naphthyl, tolyl, xylyl, and the like; aralkyl, such as benzyl, phenyethyl, phenylpropyl, and the like; halogenated derivatives of the aforesaid radicals including chloromethyl, trifluoromethyl, chloropropyl, chlorophenyl, dibromophenyl, tetrachlorophenyl, difluorophenyl and the like; cyanoalkyl, such as beta-cyanoethyl, gamma-cyanopropyl, beta-cyanopropyl and the like.

Preferably, R and R' are selected from among methyl and phenyl and most preferably, R and R' are methyl.

It is to be understood, of course, that the above formula is intended to include organopolysiloxanes which are vinyl terminated, or contain the vinyl groups along the chain or which are vinyl terminated and also contain vinyl groups along the chain.

The organohydrogenpolysiloxanes employed in the compositions of this invention are those which have structural units represented by the formula,

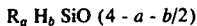

wherein R is as defined above, $a$ is from about 0.5 to 2, inclusive, $b$ is from about 0.05 to 2, inclusive, and the sum of $a$ and $b$ is from about 1 to 3, inclusive. Preferably R is methyl.

The organohydrogenpolysiloxanes of the composition are fluids which are preferably, but not necessarily, free of olefinic unsaturation. These are well known in the art and are described in detail in U.S. Pat. No. 3,344,111 to Chalk, the disclosure of which is incorporated herein by reference.

A broad range of conductivities may be obtained in the present silicone compositions by incorporating various amounts of carbon black filler (iii) into the organopolysiloxane. For this purpose, any of the carbon blacks conventionally employed for imparting electrical conductivity of silicones may be used, such as acetylene black. A preferred conductive carbon black is Shawinigan Black. Generally, the higher the amount of carbon black which is added, the greater will be the conductivity and, correspondingly, the lower will be the volume resistivity.

The organopolysiloxane compositions of the present invention may also comprise, in addition to the conductive carbon black, other conventional additives, such as reinforcing fillers commonly used in connection with organopolysiloxanes. Inorganic reinforcing fillers, such as silica fillers, are especially advantageous. These may include silica aerogel, fumed silica, precipitated silica, and the like. Especially preferred is Cab-O-Sil, commercially available from Cabot Corporation, Massachusetts, U.S.A. By adjusting the carbon to reinforcing filler ratio, a broad range of conductivities can be obtained.

The peroxide catalyst (iv) of the present compositions should be selected from among the alkyl peroxides or aralkyl peroxides commonly employed in the curing of silicones. Especially preferred are di-t-butyl-peroxide and dicumyl peroxide. Benzoyl peroxides and halobenzoyl peroxides, such as 2,4-dichlorobenzoyl peroxide, should be avoided inasmuch as the catalytic activity of these materials is inhibited by the presence of conductive carbon black.

The platinum catalyst (v) may be selected from among any of the platinum addition catalysts which are known to be effective in curing silicone gums at room temperature. These materials include, for example, finely divided elemental platinum catalysts, such as those described in U.S. Pat. No. 2,970,150 to Bailey, the chloroplatinic acid catalysts described in U.S. Pat. No. 2,823,218 to Speier, the platinum hydrocarbon complexes shown in U.S. Pat. No. 3,159,601 to Ashby and U.S. Pat. No. 3,159,662 to Ashby, as well as the platinum alcoholate catalysts described in U.S Pat. No. 3,220,972 to Lamoreaux. Moreover, the platinum chlorideolefin complexes described in U.S. Pat. No. 3,516,946 to Modic are also useful herein. Mixtures of these compounds may also be usefully employed. All of the aforesaid U.S. patents are intended to be incorporated herein by reference.

The present compositions are preferably prepared in two parts which are combined prior to hot air vulcanization. Preferably one part will comprise a carbon black-filled organopolysiloxane gum, an organohydrogenpolysiloxane, and a peroxide catalyst, and the other part will comprise a carbon blackfilled organopolysiloxane gum and a platinum or platinum compound catalyst. The two portions can be combined by rubber milling or dough mixing. Amounts of the peroxide catalyst and the platinum catalyst are used which allow the two parts to be combined and yet stored for up to 24 hours at room temperature without the occurrence of substantial cross-linking. An extrudable product that hot air cures is obtained even after such storage.

In general, the compositions of the present invention are cured at elevated temperatures in the range of from about 400° to about 750° F. Complete cure time can vary considerably, e.g., from less than a minute to 10 minutes or more, e.g., from about 2 to about 15 minutes depending on factors such as the thickness of the extruded product, the relative proportions of ingredients, and other operating conditions. These and other details concerning the curing of the compositions are readily ascertainable by those skilled in the art.

The following examples are presented in order to provide a better understanding of how the present invention is practiced. It will be understood, that these examples are provided by way of illustration and are not intended to be limiting.

EXAMPLE 1

This example illustrates the preparation of a cured, semi-conductive silicone rubber, according to the method of the present invention.

A two-part package is prepared having the following formulation:

| PART A: | |
|---|---|
| Components | Amounts (Parts By Weight) |
| Methylvinyl polysiloxane gum | 100 |
| Methyl hydrogen-containing polysiloxane fluid | 0.7 |
| Acetylene black (Shawinigan Black) | 40 |
| Dicumyl peroxide catalyst | 2.0 |

| PART B: | |
|---|---|
| Components | Amounts (Parts By Weight) |
| Methylvinyl polysiloxane gum | 100 |
| Acetylene black (Shawinigan Black) | 40 |
| Platinum alcoholate catalyst | .0075 |

Prior to use, the two parts are combined by milling 95 parts of A with 5 parts of B. No cross-linking will occur even after storage for 24 hours at 23° C.

To use, the composition is extruded to the shape of a tape of 75 mils thickness, then it is vulcanized by curing in a hot air tunnel oven at 700° F, for 30 seconds.

The electrical conductivity of the cured composition is measured, and the Volume Resistivity is 10 ohm-cm. Other properties of the cured composition are as follows:

| Tensile Strength (ASTM D-412) | 500 psi |
|---|---|
| Elongation at break (ASTM D-414) | 140% |
| Hardness, Shore A (ASTM D-676) | 60 |

Other modifications of the compositions of the invention illustrated above are possible. For instance, the two parts of the composition can be blended in various other ratios. A 50/50 blend of Parts A and B is particularly suitable for commercial preparations. Instead of dicumyl peroxide as a catalyst, other peroxide catalysts can be employed, e.g., di-t-butyl peroxide. Instead of a platinum alcoholate catalyst, finely divided elemental platinum, chloroplatinic acid and platinum-hydrocarbon complexes can be used. In addition to carbon black, reinforcing filler can be used such as colloidal silica, it being understood, however, that as larger amounts of such reinforcing fillers are added at the expense of the carbon black filler, the electrical conductivity of the composition can be adversely affected.

It is, therefore, to be understood that changes may be made in the particular embodiments of the invention described above which are within the full intended scope of the invention as defined in the appended claims.

We claim:

1. In a composition vulcanizable to an electrically conductive silicone elastomer, said composition comprising:
   i. a vinylorganopolysiloxane gum;
   ii. an organohydrogenpolysiloxane;
   iii. an electically conductive carbon black filler in an amount capable of rendering the cured composition electrically conductive; and
   iv. a small, effective amount, sufficient to cure the composition with steam or under compression molding conditions, of a peroxide catalyst which is not normally capable of curing the composition on exposure to hot air, the improvement which comprises including in said composition
   v. a catalyst comprising platinum or a platinum compound in a small amount, at least effective to render the composition vulcanizable upon exposure to hot air but less than an amount which will cause any substantial cross-linking of the composition within 24 hours at a temperature of about 23° C.

2. A composition as defined in claim 1 wherein said organohydrogenpolysiloxane (ii) comprises from about 0.1 to about 1.0 parts by weight, said filler (iii) comprises from about 20 to about 50 parts by weight, said peroxide catalyst (iv) comprises from about 0.2 to about 2.0 parts by weight, and said catalyst comprising platinum or a platinum compound (v) comprises from about 0.0001 to about 0.005 parts by weight per 100 parts by weight of said gum (i).

3. A composition as defined in claim 1 wherein the vinylorganopolysiloxane gum (i) is of the formula

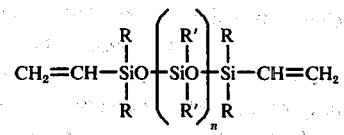

where R and R' may be the same or different and are monovalent hydrocarbon groups free of aliphatic unsaturation, with at least 50 mole percent of R' being methyl and where $n$ has a value sufficient to provide a gum-like consistency at room temperature.

4. A composition as defined in claim 1 wherein the organohydrogenpolysiloxane (ii) is comprised of structural units of the formula

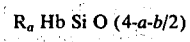

wherein R is a monovalent hydrocarbon free of aliphatic unsaturation, $a$ is from about 0.5 to 2, inclusive, $b$ is from about 0.05 to 2, inclusive, and the sum of $a$ and $b$ is from about 1 to 3, inclusive.

5. A composition as defined in claim 1 wherein said vinylorganopolysiloxane gum is a methylvinylpolysiloxane gum.

6. A composition as defined in claim 5 wherein said methylvinylpolysiloxane gum is a dimethylvinyl chain-stopped dimethylpolysiloxane gum.

7. A composition as defined in claim 1 wherein said carbon black filler (iii) is an acetylene black.

8. A composition as defined in claim 1 wherein said peroxide is dicumyl peroxide, di-t-butyl peroxide or a mixture thereof.

9. A composition as defined in claim 1 wherein said catalyst (v) comprises finely divided elemental platinum, chloroplatinic acid, a platinum hydrocarbon complex, a platinum alcoholate, a platinum chloride-olefin complex or a mixture of any of the foregoing.

10. A composition as defined in claim 1 which, after vulcanization, exhibits a volume resistivity of less than 10,000 ohm-cm., a Shore A hardness of at least 50, a tensile strength of greater than 450 pounds per square inch and an elongation of greater than 100 percent at break.

11. In a process for preparing an electrically conductive vulcanized silicone elastomer comprising:
A. forming a composition of:
  i. a vinylorganopolysiloxane gum;
  ii. an organohydrogenpolysiloxane;
  iii. an electrically conductive carbon black filler in an amount capable of rendering the cured composition electrically conductive; and
  iv. a small, effective amount, sufficient to cure the composition with steam or under compression molding conditions, of a peroxide catalyst which is not normally capable of curing the composition on exposure to hot air, and
B. heating the composition under vulcanizing conditions until it is substantially cured, the improvement which comprises adding to said composition before vulcanization (v) a catalyst comprising platinum or a platinum compound in a small amount, at least sufficient to render the composition vulcanizable upon exposure to hot air but less than an amount which will cause any substantial cross-linking of the composition within 24 hours at a temperature of about 23° C., shaping to form, and thereafter heating the composition in hot air until it has been substantially completely vulcanized.

12. A process as defined in claim 11 wherein said organohydrogenpolysiloxane (ii) comprises from about 0.1 to about 1.0 parts by weight, said filler (iii) comprises from about 20 to about 50 parts by weight, said peroxide catalyst (iv) comprises from about 0.2 to about 2.0 parts by weight, and said catalyst comprising platinum or a platinum compound (v) comprises from about 0.0001 to about 0.005 parts by weight per 100 parts by weight of said gum (i).

13. A process as defined in claim 11 wherein the vinylorganopolysiloxane gum (i) is of the formula

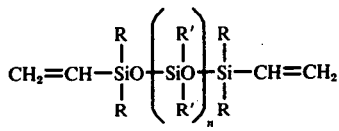

wherein R and R' may be the same or different and are monovalent hydrocarbon groups free of aliphatic unsaturation, with at least 50 mole percent of R' being methyl and where $n$ has a value sufficient to provide a gum like consistency at room temperature.

14. A process as defined in claim 11 wherein the organohydrogenpolysiloxane (ii) is comprised of structural units of the formula $$R_a H_b Si O_{(4-a-b)/2}$$

wherein R is a monovalent hydrocarbon free of aliphatic unsaturation, $a$ is from about 0.5 to 2, inclusive, $b$ is from about 0.05 to 2, inclusive, and the sum of $a$ and $b$ is from about 1 to 3, inclusive.

15. A process as defined in claim 11 wherein said vinylorganopolysiloxane gum is a methylvinylpolysiloxane gum.

16. A process as defined in claim 15 wherein said methylvinylpolysiloxane gum is a dimethylvinyl chain-stopped dimethylpolysiloxane gum.

17. A process as defined in claim 11 wherein said carbon black filler (iii) is an acetylene black.

18. A process as defined in claim 11 wherein said peroxide is dicumyl peroxide, di-t-butyl peroxide or a mixture thereof.

19. A process as defined in claim 11 wherein said catalyst (v) comprises finely divided elemental platinum, chloroplatinic acid, a platinum hydrocarbon complex, a platinum alcoholate, a platinum chloride-olefin complex or a mixture thereof.

20. A process as defined in claim 11 in which said composition, after vulcanization, exhibits a volume resistivity of less than 10,000 ohm-cm., a Shore A hardness of at least 50, a tensile strength of greater than 450 pounds per square inch and an elongation of greater than 100 percent at break.

21. A process as defined in claim 11 wherein vulcanization is effected by heating said composition in air at a temperature of from about 400° to about 750° F. for from about 2 to about 15 minutes.

* * * * *